United States Patent [19]

Smith et al.

[11] 3,848,966

[45] Nov. 19, 1974

[54] HOMEOTROPIC ALIGNMENT ADDITIVE FOR LIQUID CRYSTALS

[75] Inventors: George W. Smith, Birmingham; Daniel B. Hayden, Port Huron, both of Mich.

[73] Assignee: General Motors Corporation, Detroit, Mich.

[22] Filed: Oct. 15, 1973

[21] Appl. No.: 406,636

[52] U.S. Cl. ............ 350/160 LC, 252/299, 350/150
[51] Int. Cl. ................................................ G02f 1/16
[58] Field of Search ............ 252/299, 408; 350/150, 350/160 LC

[56] References Cited
UNITED STATES PATENTS

| | | |
|---|---|---|
| 3,656,834 | 4/1972 | Haller et al. ........................ 350/150 |
| 3,694,053 | 9/1972 | Kahn.................................. 350/150 |
| 3,803,050 | 4/1974 | Hans et al........................... 252/408 |
| 3,809,456 | 5/1974 | Goldmacher et al. ........ 350/160 LC |

*Primary Examiner*—Edward S. Bauer
*Attorney, Agent, or Firm*—Robert J. Wallace

[57] ABSTRACT

A nematic liquid crystal mixture with a natural tendency to homeotropically align to boundary surfaces, and maintain such alignment for long periods under alternating current electric fields. The mixture includes a nematic liquid crystal and an additive having the formula:

$$R-CH(COOH)_2,$$

where R is a long chain alkyl radical, such as an octadecyl radical. A display device having such a liquid crystal mixture is described.

2 Claims, 1 Drawing Figure

PATENTED NOV 19 1974            3,848,966
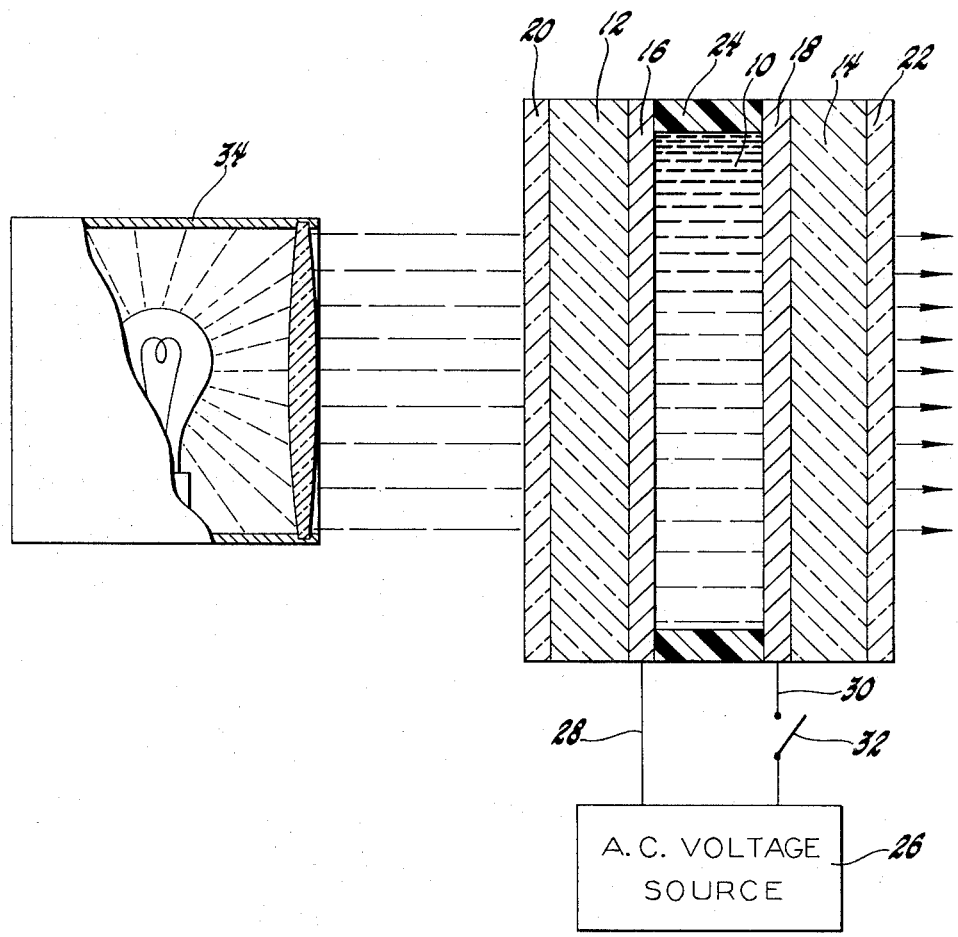

HOMEOTROPIC ALIGNMENT ADDITIVE FOR LIQUID CRYSTALS

BACKGROUND OF THE INVENTION

This invention relates to liquid crystals. More particularly it relates to liquid crystal mixtures containing a homeotropic orientation alignment additive. It also concerns electro-optic display devices made with such mixtures.

This invention is principally directed to nematic liquid crystals, with other types of liquid crystals being smectic and cholesteric. Liquid crystals are anisotropic in their optical, electrical and magnetic properties. Nematic liquid crystals have elongated rod-like molecules which in their natural state tend to orient themselves parallel to the longitudinal axes of adjacent molecules. Such orientation will extend for distances substantially greater than the molecular dimensions. While the orientation of order is usually more or less on a local scale, the order varies randomly from place to place, with the variation being abrupt or gradual.

The forces responsible for the orientational order in liquid crystals are much smaller than the corresponding forces responsible for the large scale order present in solids. Because of this, external forces such as those due to boundary surfaces, electric fields, and magnetic fields can more readily influence the alignment of a nematic liquid crystal. These effects and the anisotropic character of the liquid crystal give rise to pronounced electro-optical effects which have been advantageously employed in display devices. Due to the discontinuous nature of surface effects on an untreated surface in contact with a liquid crystal, a nonuniform textured surface appearance results.

As previously mentioned, molecular orientation can be affected by external forces such as boundary surfaces. It is known, for example, that the past history of a boundary surface can have a pronounced effect on molecular orientation in a nematic liquid crystal. The liquid crystal molecules adjacent to the boundary surface often tend to line up parallel to the boundary surface, with the direction of alignment in various regions or domains varying randomly in the plane parallel to the boundary surface. This in-plane randomness in alignment makes a detailed liquid crystal structure that is not useful for devices operating by electrically controlled birefringence. Also, it exhibits a nonuniform, textured surface appearance that is objectionable for electro-optical devices operating by dynamic scattering.

In view of the foregoing, another form of alignment is often used in liquid crystal display devices, one in which all of the molecules are aligned perpendicular to the boundary surface. This perpendicular alignment is referred to as homeotropic alignment. This form of alignment gives the effect of a single domain liquid crystal. It has been obtained by inducing perpendicular alignment of the liquid crystal molecules at the boundary surface. This layer of molecules at the boundary surface induces a similar alignment of the next molecular layer, and so on, to each successive molecular layer of the liquid crystal, tending to orient a substantial thickness of the liquid crystal perpendicular to the boundary surface. Thicknesses up to about 1000 microns can be so oriented.

Homeotropic alignment can be produced, for example, by treating the glass substrate with lecithin before placing it in contact with the liquid crystal. However, a more desirable way is to form a nematic liquid crystal mixture having an additive which induces orientation perpendicular to the boundary surface, regardless as to the past history of the boundary surface. Such mixtures tend to be more permanently aligned, and are more uniform in effect. U.S. Pat. No. 3,656,834 describes an additive for a nematic liquid crystal. The additive described in U.S. Pat. No. 3,656,834 can be characterized as an alkyl substituted ammonium salt.

A number of other additives have been proposed in the past for inducing homeotropic alignment, regardless as to past history of the boundary surface. However, the cosmetic appearance of electro-optical devices containing liquid crystals with these additives that we tried tend to deteriorate at various rates under the influence of electrical fields such as are applied in electro-optical devices. On the other hand, we have found an additive which not only initially provides extremely uniform homeotropic alignment of nematic liquid crystals, irrespective of the past history of boundary surfaces, but which survives for long periods of time under the influence of electrical fields such as applied in electro-optical devices. With our additive no special boundary surface preparation is required, except for the usual requirement of surface cleanliness.

OBJECTS AND SUMMARY OF THE INVENTION

It is, therefore, an object of our invention to provide a liquid crystal mixture that initially provides homeotropic alignment at boundary surfaces but which in addition maintains such alignment for extremely long periods of time under electrical fields such as applied in electro-optical devices. A further object of the invention is to provide an electro-optical device having a nematic liquid crystal mixture which inherently homeotropically aligns with boundary surfaces.

These and other objects of the invention are attained with a liquid crystal mixture containing an alpha, gammapropanedioic acid having a long chain alkyl radical at the beta position. Octadecylmalonic acid has been found to be highly effective.

BRIEF DESCRIPTION OF THE DRAWING

Other objects, features and advantages of this invention will become more apparent from the following description of preferred examples thereof and from the drawing which schematically discloses an electrically controlled birefringent electro-optical cell made with a liquid crystal mixture of this invention.

DESCRIPTION OF THE PREFERRED EMBODIMENTS

In accordance with the invention a small proportion of an orientation controlling additive is mixed with a negative dielectric anisotropy, $-\Delta\epsilon$, nematic liquid crystal to form a mixture which inherently homeotropically aligns with boundary surfaces, regardless of the past history of those boundary surfaces. It is believed that the orientation controlling additive is adsorbed on a boundary surface contacting the nematic liquid crystal mixture. We further believe the additive homeotropically aligns on the boundary surface to induce a similar homeotropic alignment of the nematic liquid crystal molecules.

We have found that octadecylmalonic acid, $CH_3(CH_2)_{17}CH(COOH)_2$, is highly effective in producing substantially permanent homeotropic alignment of a nematic liquid crystal even under substantially continuous application of electric fields. It has maintained homeotropic alignment for thousands of hours of continuous operation in an electro-optical device. This additive has the general formula:

$$R—CH(COOH)_2,$$

where R is a long chain alkyl radical of 18 carbon atoms. It is expected that alkyl radical chain lengths of 16 – 20 carbon atoms may also provide satisfactory results.

We believe the carboxyl groups, and perhaps even the hydrogen atom, attach themselves to the boundary surface contacting the liquid crystal to inherently orient the attached long alkyl radical perpendicular to the boundary surface. The alkyl chain must be long enough to induce homeotropic alignment of the nematic liquid crystal molecules. However, it must not be so long as to induce ancillary deleterious effects. Octadecylmalonic acid apparently has a chain length long enough to induce such alignment and yet not so long as to contribute to ancillary deleterious effects.

Even small but effective amounts of the additive tend to induce homeotropic alignment. However, significant practical effects for electro-optical devices are not obtained unless about 0.2 percent, by weight, is employed. We have found highly satisfactory results can be obtained with 0.5%, by weight, of the additive. Increased amounts up to saturation may be useful. However, increased amounts produce increased conductivity in the liquid crystal. Moreover, if the liquid crystal mixture is to be subject to varying temperature conditions it is generally not desirable to use amounts which approach maximum solubility of the additive in the liquid crystal. The additive may precipitate from the liquid crystal after incorporation in a display device, to produce a multiplicity of undesirable effects.

We have made electro-optical devices with the nematic liquid crystal p-(methoxy benzylidene)-n-butylaniline, popularly referred to as MBBA. The excellent results obtained indicate that our additive should be equally effective on other nematic liquid crystals, especially those with a negative dielectric anisotropy. It may also be effective in producing useful alignment in smectic and cholesteric liquid crystals.

FIG. 1 illustrates an improved electro-optic device made using a liquid crystal mixture of our invention. The device is constructed in the usual manner, and is improved in that it contains our improved liquid crystal mixture. The liquid crystal mixture is MBBA containing 0.5 percent, by weight, octadecylmalonic acid. The liquid crystal mixture 10 is sandwiched between two parallel glass plates 12 and 14. While glass is used for plates 12 and 14, any other inert material of like transparency can be used. Transparent electrically conductive films on the facing surfaces of glass plates 12 and 14 serve as electrodes and contact the liquid crystal mixture 10. Electrodes 16 and 18 can be made of 1,000 – 3,000 angstrom films of tin oxide, indium oxide or the like. The outer surfaces of glass plates 12 and 14 have films 20 and 22, respectively, of a light polarizing material oriented in the usual manner to form crossed polarizers. Polarizing films 20 and 22, respectively, form a polarizer and analyzer for the device. Such films can be made by incorporating into a transparent plastic a large number of small crystals of a compound, such as an iodide of quinine, which possess the property of double refraction, and orienting the crystals all in one direction. However, we prefer to employ commercially available films for best results. The polarizer 20 and analyzer 22 are oriented so that light passing through the polarizer must be rotated 90° to pass through the analyzer. This arrangement of analyzer and polarizer is referred to as crossed polarizers. The polarizer and analyzer can be formed as films attached to the outer surfaces of glass plates 12 and 14, or they can be formed as discrete elements placed in close proximity and parallel to the outer surfaces of glass plates 12 and 14. The films 16, 18, 20 and 22 are shown in exaggerated thicknesses for purposes of illustration.

Glass plates 12 and 14, and their adherent conductive films 16 and 18, are spaced from one another by means of an annular teflon spacer 24, which in conjunction with glass plates 12 and 14, forms a closed chamber for containment of the liquid crystal 10. Spacer 24 is of appropriate thickness to provide an electrode spacing, and attendant liquid crystal mixture thickness, of about 10 – 1,000 microns. Electrodes 16 and 18 are connected to an alternating current voltage source 26 through leads 28 and 30 and switch 32. The horizontal lines in nematic liquid crystal 10 are intended to connote the homeotropic alignment of the liquid crystal mixture throughout its thickness when no voltage is applied. The frequency of voltage source 26 can be varied from about 10 to 1,500 hertz. The threshold voltage is somewhat over 4 volts. The usual operating voltage is about 5 – 25 volts, depending on frequency of the alternating current and type of electro-optical device. A source of parallel light 34 is shown directing its rays normal to the surface of polarizer 20.

To form a cell such as described, the octadecylmalonic acid is first completely dissolved in MBBA, a nematic liquid crystal having a negative dielectric anisotropy. About 0.0025 gram of octadecylmalonic acid was added to 0.5 gram of MBBA, and thoroughly mixed. After mixing, the solution was placed in an oven and kept at 48°C. overnight to provide an environment above the nematic-isotropic transition point of the liquid crystal. It appears that the additive dissolves more evenly into the MBBA when the liquid crystal is in its isotropic phase.

In the meantime, two glass plates having indium oxide film electrodes thereon were thoroughly cleaned so as to remove any particles or substances which would interfere with the orientational effects of the additive. The electrodes were first soaked in a soap solution for one-half hour and then rinsed successively with water and acetone. They were then immersed for ten minutes in a solution containing 25 parts by volume concentrated sulfuric acid and 1 part by volume of a saturated aqueous sodium dichromate solution. Afterwards, they were rinsed in flowing deionized water for one-half hour, and then successively in methanol and chloroform for 5 minutes each. They were then degreased with isopropyl alcohol for 1 hour, and dried in air at about room temperature for 5 to 10 minutes. While this extreme in cleanliness may not be necessary, we prefer it. It insures that we will consistently obtain highly satisfactory results.

The cells were assembled in a vacuum desiccator to avoid producing air bubbles in the cell. After assembly the edges between the glass plates around the spacer 24 were sealed to insure structural integrity and prevent air leakage into the liquid crystal mixture of the resultant device. After the cell was completed it was placed between crossed polarizers for operation in the electrically controlled birefringence mode.

In operation, very little of normally incident light from source 34 will pass through analyzer 22 unless a voltage is applied to the cell. However, when a sufficient voltage is applied to the cell, a significant proportion of light will pass through analyzer 22.

We claim:
1. A nematic liquid crystal material which assumes a homeotropic texture comprising a nematic material having a negative dielectric anisotropy and having dissolved therein from small but effective amounts to 0.5 percent octadecylmalonic acid.

2. An electro-optical display device comprising two parallel transparent members spaced apart about 10 – 100 microns, transparent electrodes on the facing surfaces of said members, a nematic liquid crystal material extending between and contacting said electrodes, said nematic liquid crystal assuming a homeotropic alignment with said electrodes and having dissolved therein 0.2 – 0.5 percent octadecylmalonic acid, two crossed polarizers located adjacent the outer surfaces of the transparent members, and means for applying an electric field across said nematic liquid crystal through said electrodes that exceeds a threshold electric field for inducing deformation of said homeotropic alignment.

* * * * *